(12) United States Patent
Simmons et al.

(10) Patent No.: US 8,061,879 B2
(45) Date of Patent: Nov. 22, 2011

(54) SMART LIGHTS

(76) Inventors: Isaiah Monty Simmons, Lenoir, NC (US); William Monty Simmons, Lenoir, NC (US); Joseph Frank Preta, Tampa, FL (US); Dominic Joseph Preta, Tampa, FL (US); Hans Christer Preta, Tampa, FL (US)

( * ) Notice: Subject to any disclaimer, the term of this patent is extended or adjusted under 35 U.S.C. 154(b) by 333 days.

(21) Appl. No.: 12/269,881

(22) Filed: Nov. 12, 2008

(65) Prior Publication Data

US 2009/0122571 A1    May 14, 2009

Related U.S. Application Data

(60) Provisional application No. 60/987,074, filed on Nov. 11, 2007.

(51) Int. Cl.
*B60Q 1/26* (2006.01)
*B60Q 1/52* (2006.01)

(52) U.S. Cl. ......... 362/485; 362/546; 340/431; 340/468

(58) Field of Classification Search ............ 362/546, 362/471, 488, 464, 466, 485, 486; 340/431, 340/468 –479
See application file for complete search history.

(56) References Cited

U.S. PATENT DOCUMENTS

| | | | | |
|---|---|---|---|---|
| 4,859,982 | A * | 8/1989 | Seaburg | 340/475 |
| 5,424,715 | A * | 6/1995 | Lietzow et al. | 340/539.1 |
| 5,442,332 | A * | 8/1995 | Hughes | 340/467 |
| 5,666,103 | A * | 9/1997 | Davis, Jr. | 340/479 |
| 6,100,801 | A * | 8/2000 | Plummer | 340/479 |
| 7,199,705 | B1* | 4/2007 | Mixon | 340/479 |
| 7,557,699 | B2* | 7/2009 | Walton | 340/472 |
| 2003/0210167 | A1 | 11/2003 | Weng | |
| 2004/0192227 | A1 | 9/2004 | Beach et al. | |
| 2004/0232849 | A1 | 11/2004 | Roach, Jr. | |
| 2005/0073405 | A1 | 4/2005 | Spoltore et al. | |
| 2005/0258947 | A1 | 11/2005 | Kunianski | |
| 2006/0238317 | A1 | 10/2006 | Colledge | |
| 2007/0205885 | A1 | 9/2007 | Lu | |
| 2008/0258899 | A1* | 10/2008 | Stiles et al. | 340/471 |

* cited by examiner

*Primary Examiner* — Bao Q Truong
(74) *Attorney, Agent, or Firm* — Monty Simmons; Simmons Patents

(57) ABSTRACT

The disclosed invention relates to smart light apparatuses compunctions particularly well suited for providing wireless communications between a true vehicle and a died in being towed such as a trailer. A smart light controller comprising a process for his electrically associated with a traditional wiring harness associated with a two vehicle. The smart light controller detects light signals such as stop, left turn, right turn, and lights on and generates a corresponding RF control signals. The RF control signals are transmitted to smart lights associated with a vehicle can configured to receive the RF control signals. The smart light generates a light signal based on the receive control signals.

17 Claims, 7 Drawing Sheets

ID
SMART LIGHTS

CLAIM TO PRIORITY

This application is a continuation in part to non-provisional application 60/987,074 filed on Nov. 11, 2007, the entire contents of which are incorporated herein by this reference for all that it discloses.

TECHNICAL FIELD OF THE INVENTION

Embodiments of the present invention relate to smart light apparatuses and methods for providing a variety of functions including lighting functions, signaling functions, security functions, emergency functions, and monitoring functions.

BACKGROUND

There is often need for providing signaling functions to a vehicle such as a trailer or automobile. Many times such signaling functions are difficult to add after the fact. In addition, prior art wired systems can be very annoying when they are not working properly. Consequently, there is a need for a simple way of adding lighting features, such as signaling features, to items such as vehicles.

Exemplary embodiments of the invention relate to a smart light apparatus and system for providing trailers and vehicles with signaling functions with or without a direct wired connection. The smart light apparatus can also monitor and transmit to a user a variety of environment data such as visual, audio, temperature, ice warning, collision warning, and RF warnings.

Other embodiment relate to smart lights configurable to perform a variety of tasks including lighting a path, lighting a room, providing emergency lighting, lighting associated with an alarm system, and for carrying around to perform the function of a traditional flashlight.

SUMMARY

Some of the objects and advantages of the invention will now be set forth in the following description, while other objects and advantages of the invention may be obvious from the description, or may be learned through practice of the invention.

Broadly speaking, a general object of the present invention is to provide an apparatus and method for providing a wireless light signaling system to an item such as a vehicle or trailer.

It is another general object of the invention to provide back up emergency lighting with remote control features.

Additional objects and advantages of the present invention are set forth in the detailed description herein or will be apparent to those skilled in the art upon reviewing the detailed description. It should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

DETAILED DESCRIPTION

Figure 1:
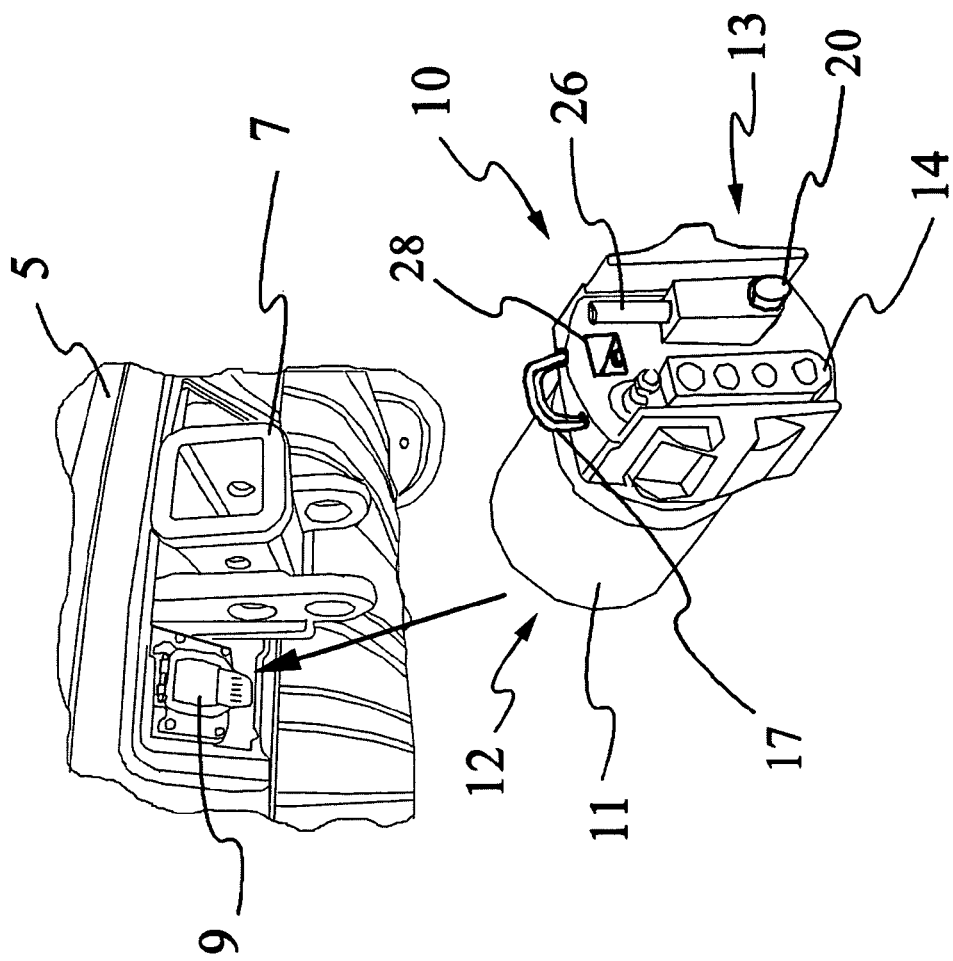
FIG. 1 is a side perspective view on one exemplary smart light controller.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

Referring now to FIG. 1, a side perspective view of one exemplary embodiment of a smart light controller configured for transmitting light command signals is presented. For the presently preferred embodiment, smart light controller 10 comprises a housing 11 defining a first end 12 and a second end 13. First end 12 is preferably configured for being associated with a light-command generator (vehicle 5) via socket 9 comprising light-command signal paths (not shown). For the embodiment depicted in FIG. 1, the light command-generator is the electrical system of vehicle 5 and the signal paths are wires that convey the traditional signals associated with a vehicle to socket 9. Such traditional signals include stop signals, turn signals, and running like signals. Restated, housing 11 defines a male plug suitable for being associated with a female socket comprising light-command signal paths where the female socket is mechanically associated with a vehicle and electrically associated with the electrical system of such vehicle.

As depicted in FIG. 1, smart light controller 10 may further comprise a security-interface associated with said housing 11. One exemplary example of a security interface is locking loop 17. Locking loop 17 is configured for receiving a cable that is secured to trailer hitch 7.

Figure 2:
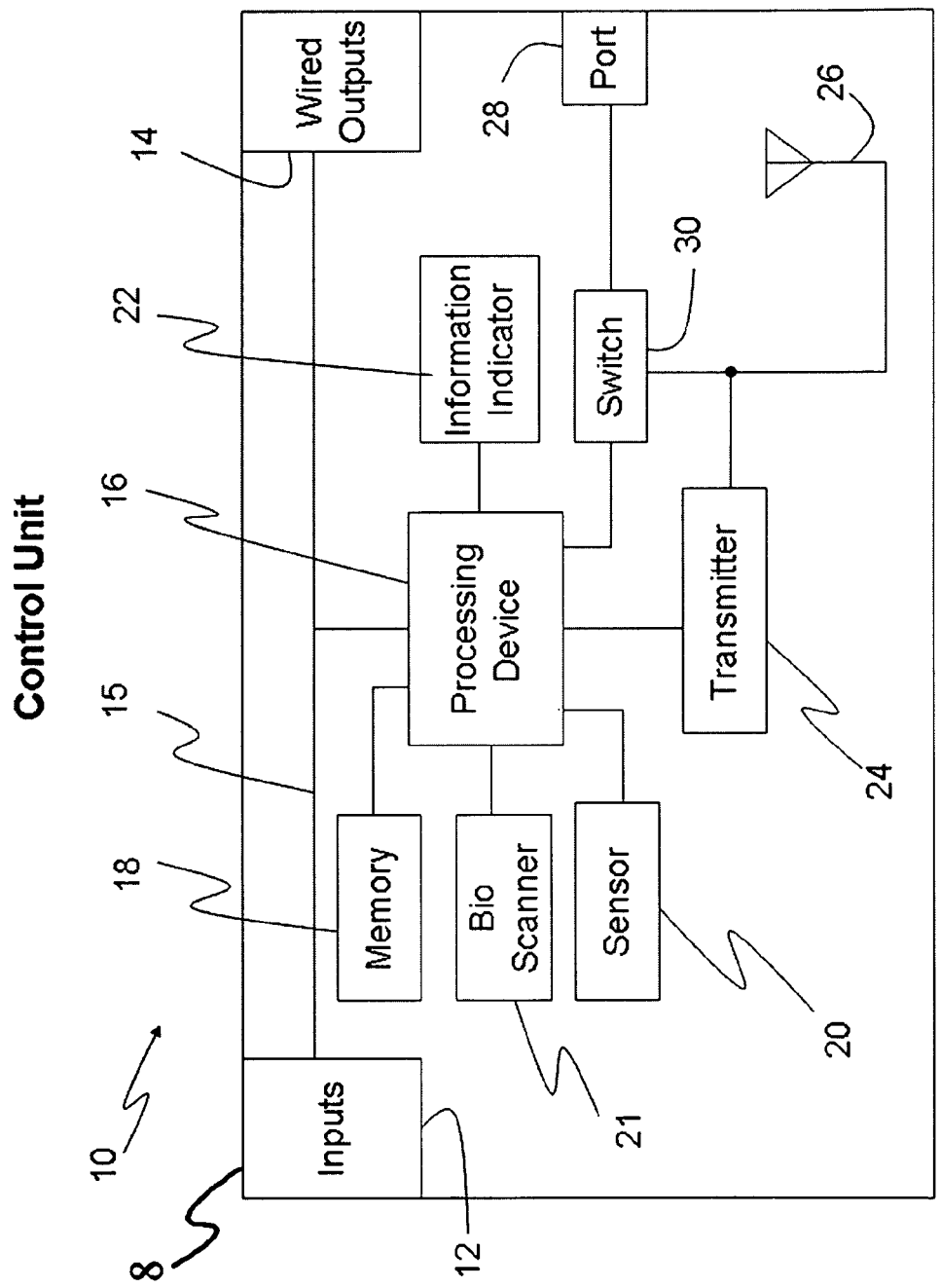
FIG. 2 is one exemplary block diagram representation of a controller.

Referring now to FIG. 1 and FIG. 2, one exemplary embodiment of a controller 8 disposed between the first end 12 and the second end 13 is presented. Controller 8 comprises processing device 16 associated with a memory 18 and a transmitter 24. It should be appreciated that while memory 18 and transmitter 24 are depicted in FIG. 2 as discrete components, embodiments of the invention where memory 18 and transmitter 24 are integrated into a single processor chip fall within the scope of the invention. Transmitter 24 is further electrically associated antenna 26.

Memory 18 may be any type of memory and may be used for storing any digitally encoded information including programs and data (e.g. sensor data). Memory 18 may be a discrete memory module electrically associated with processing device 16.

Processing device 16 is further electrically associated with input 12 configured for electrically associating processing device 16 with the light-command signal paths associated with socket 9. One of ordinary skill in the art will appreciate that such a configuration allows controller 8 to receive signals from the light-command generator. Upon receiving signals from the light command generator, processing device 16 configures the appropriate corresponding RF command signal. Such RF command signal is then transmitted to remote devices such as smart lights. In addition to providing an RF output, smart light controller may further provide a wired output (14). Wired output 14 is electrically associated with the wired input 12 and is configured to provide a "pass-through-connector" function. Wired output 14 may be the same configuration as socket 9 or wired output 14 may use other socket configurations thereby providing an adapter function.

For some embodiments of the invention, controller 8 may further comprise an information indicator 22 electrically associated with processing device 16. Information indicator 22 is configured for providing information to a user such as status information. Exemplary embodiments of information indicator 22 include LED lights or a display such as an LCD display. Such information indicator 22 may be configured to provide a connection status indicating that smart light controller 10 has been electrically associated with a properly wired socket. Information indicator 22 may further be configured to indicate the need for providing a bio-sample as described below.

For some embodiments of the invention, a Port 28 may be provided. Port 28 is preferably configured with one or more connections for providing at least one of data input and data output functions. For example, port 28 may provide a connection point for an external antenna. Additionally, port 28 may comprise a communication connection to processing device 16 for transferring data between processing device 16 and an external device electrically associated with port 28. Port 28 may be configured to perform a plurality of communication functions including: (a) upgrading firmware; (2) transferring data to processing device 16 that is (i) incorporated into a data-signal and transmitted via antenna (26), (ii) stored in a memory, and (iii) transferred to wired output (14).

Still referring to FIG. 2, controller 8 may further comprise a sensor or array of sensors 20. Sensor 20 may be any number of sensors (or only one sensor) configured for detecting and generating a signal relatable to an environmental parameter. Generally speaking, a sensor may collect data and perform at least one of the following functions: (a) transfer the data to processing device 16 or a device selected by processing device 16; (b) store the data in a local memory associated with the sensor; (c) process the data and generate a sensor-signal that is transferred to processing device 16. Possible sensor technologies include temperature, visual (image), audio, continuity, power quality, proximity, and RF sensors.

For one embodiment, sensor 20 includes an image sensor configured to capture image data of the smart light controller 10 environment. For example, where smart light controller 10 is a trailer light control unit, image sensor 20 may be configured to capture image data of the connection between a trailer and a trailer hitch associated with hitch receiver 7. Such data could be stored in memory 18 and/or transmitted to a remote device. Additionally, some trailers are difficult to see from the cab of the towing vehicle making backing up even more difficult than normal. In such circumstances, image sensor 20 may be used as an aid when backing the trailer.

For one embodiment, sensor 20 includes a temperature sensor for capturing temperature data which may be stored in memory (18) and/or transmitted to a remote device.

For yet another embodiment, sensor 20 includes a continuity sensor for determining the connection quality between two electrical connections. Such a configuration may particularly useful in verifying a connection between wired output (14) and a connector electrically associated with wired output (14). Such data could be used to perform security functions (e.g. someone stealing a trailer) or safety functions (e.g. when a wired connection has been unintentionally disconnected). For such a configuration processing device 16 is configured to may be used for detecting broadband signals and other signals (such a police RADAR). Such sensor data may be stored in memory (18) and/or transmitted to a remote device.

A biosensor 21 may also be electrically associated with processing device 16 to provide a security feature. For such an embodiment of the invention, such biosensor 21 may be any suitable type but is preferably a fingerprint scanner. For the presently preferred embodiment of the invention, enrollment samples for authorized users are collected and stored in a nonvolatile memory. There may be any number of authorized users and enrollment bio-samples. When processing device 16 determines a security bio-sample is required before activating the features within smart light controller 10, processing device 16 generates a signal requesting a bio-sample. Such signal may be a simple flashing light. A user then provides a bio-sample to processing device 16, via biosensor 21. Processing device 16 then compares the real time bio-sample with the enrollment bio-sample. If processing device 16 determines that the two bio-samples are sufficiently similar, the features of smart light controller 10 are enabled. Otherwise smart light controller 10 is disabled.

One exemplary method for configuring processing device 16 to detect when a bio-sample is needed is now described. For such a configuration, when smart light controller 10 is disassociated from socket 9, processing device 16 notes the disassociation using a flag stored in memory. The next time processing device 16 is electrically associated with socket 9, the status of the disassociation flag is examined and a real-time bio-sample is requested.

For one alternative embodiment, a unit enable device is used to activate smart light controller 10. For this embodiment, a unit enable device is electrically associated with port 28 to activate smart light controller 10. For one embodiment, unit enable device includes a chip that holds unique activation data that is examined and verified by processing device 16. If valid transmit a relatively low-power signal to an electronic device associated with vehicle 5. Such electronic device within vehicle 5 would then perform any number of functions including transmitting an emergency signal to a remote location, blowing the horn, flashing lights, and transmitting a disabled signal.

Similarly, processing device 16 is configured to detect unauthorized decoupling. An unauthorized decoupling may result from smart light control unit 10 losing communication with a smart light, or detecting the removal of an electrical connection at a wired output 14, or removal of the smart light controller from socket 9. For such a configuration, a power source may be disposed within smart light controller 10 that is electrically associated with controller 8 (if needed). When an unauthorized decoupling is detected processing device 16 generates a disabling signal. For example, such disable signal may engage the braking system of a properly configured trailer.

For yet another embodiment, processing device 16 includes a power quality sensor 20 for monitoring the quality of power supplied to smart light controller 10. Alternatively, such a sensor may be used to monitor the power quality of a power source associated with external device such as a battery used to power emergency trailer brakes. Such sensor data may be stored in memory (18), evaluated by processing device 16, and/or transmitted to a remote device.

Another alternative embodiment for sensor 20 includes a proximity sensor for detecting when an objection is comes within a predefined distance to processing device 16. Such data is useful when backing a vehicle or trying to connect a trailer to a trailer hitch.

For yet another embodiment, sensor 20 includes a RF sensor for detecting the presence of RF energy that may disrupt normal operation of the system. Similarly, a plurality of RF sensors activation data is received by processing device 16, smart light controller 10 is enabled. Otherwise, smart light controller 10 is disabled. Such activation data may comprise a security code that is incorporated into data-signals generated by smart light controller 10. Such a configuration provides a security function as well as an anti interference function. As described later, only smart lights 50 that have been activated with the same activation data will be able to respond to data-signal transmitted by smart light controller 10. First, as a security feature, smart light (50) devices that have been stolen will not be able to respond to a transmitted data-signal. Second, smart light 50 devices associated with a first smart light controller 10 device will not be affected by data-signals generated by a second, nearby, smart light controller device that has been activated with different activation data.

Smart light controller 10 is preferably configured to receive power via inputs 12. Alternatively, smart light controller 10 may receive power from an internal power source such as a battery.

Figure 3:
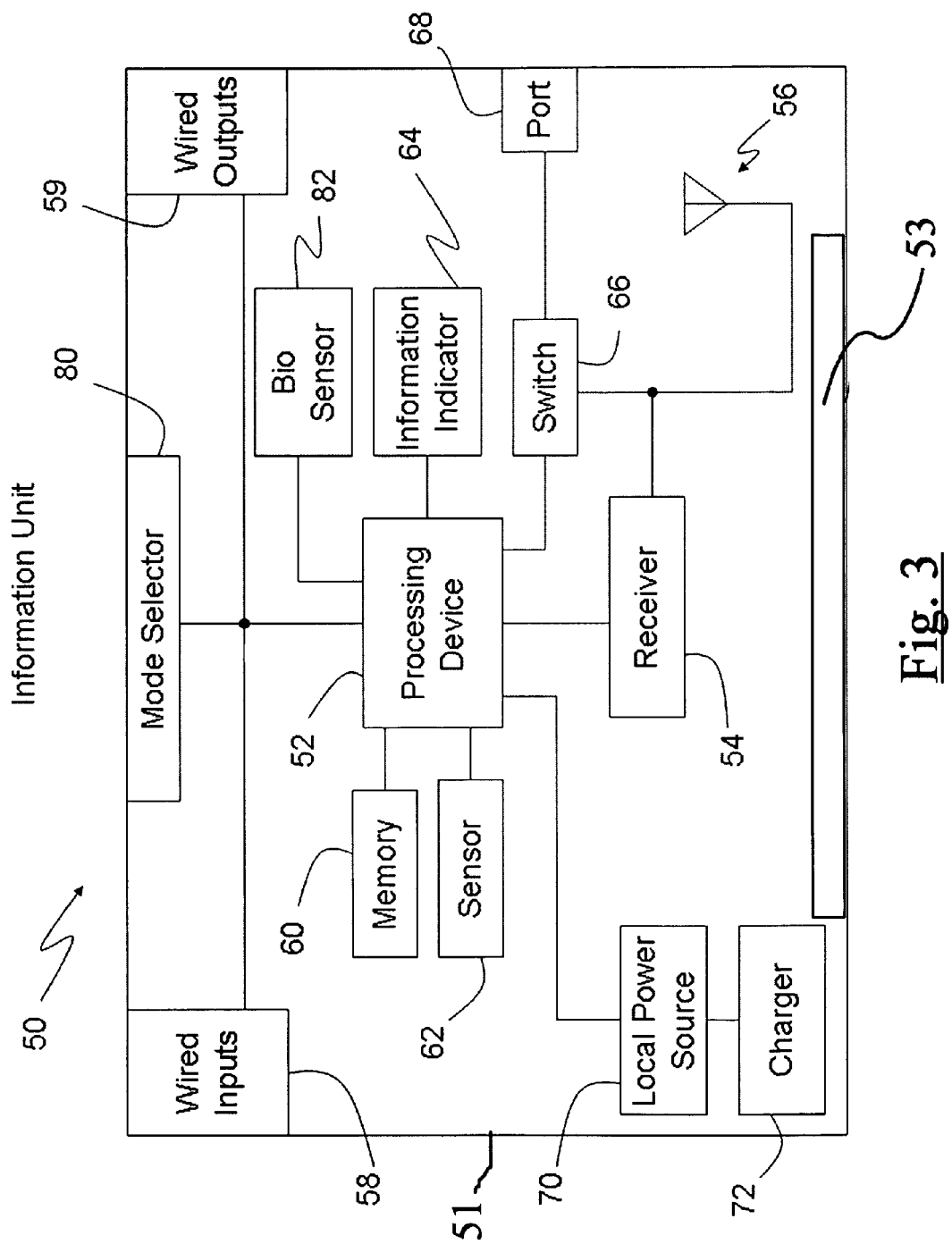
FIG. 3 is one exemplary block diagram representation of an information unit.

Referring now to FIG. 3, one exemplary embodiment of an information unit 50 is presented. Information unit 50 comprises a housing 51 defining a housing interface 53 configured for being associated with an item interface. Exemplary embodiments of an item interface include a bracket configured to receive connectors such as nuts and bolts and screws. Other item interface configurations include a magnetically enabled surface such as a steel plate or a super magnet. Where the item interface is a steel plate, housing interface 53 is a super magnet. Where the item interface is a super magnet, housing interface 53 may be either a steel plate or similar surface for a super magnet. One of ordinary skill in the art will appreciate that such a configuration allows information unit 50 to be associated with a variety of items. For example, where the item is a trailer, the item interface may be a bracket on the site of the trailer configured to receive a signal light.

Information unit 50 further comprises a processing device 52 disposed within said housing 51. Processing device 52 is electrically associated with a memory 60 and a receiver 54. Receiver 54 is electrically associated with antenna 56. Information indicator 64 is electrically associated with said processing device 52.

For the smart light configuration depicted in FIG. 3 processing device 52 is configured to "listen" for a properly coded RF command signal using receiver 54 and generate the corresponding information indicator control signals. Such information indicator control signals are then transferred to information indicator 54 which in turn generates a display based on such control signals.

As described earlier, memory 60 may be an external component electrically associated with processing device 52 or alternatively, a memory integrated into processing device 52. In addition, receiver 54 may be a transceiver configured to receive and transmit RF signals. Alternatively a discrete transmitter may be electrically associated with processing device 52.

Information unit 50 may further comprise mode selector 80. Mode selector 80 is an electronic switch or electromechanical switch configured to define one of a plurality of display modes. For example, information unit 50 may be the left signal light associated with the rear of a trailer. For this configuration, mode selector 80 is set to instruct processing device 52 that information unit 50 is to perform the functions of a left signal light. Alternatively, information unit 50 may be a right signal light associated with the rare of a trailer. Other smart light configurations include running lights. Thus, mode selector 80 may have left, right, and running light selection options. Any suitable selection technology may be used to implement the mode selector 80 function. Such selection technology includes a magnetic reed switch, a mechanical switch, an infrared interface, and a weigan wire based switch.

Information unit 50 further comprises a power source disposed within or associated with housing 51. Alternatively, information unit 50 may provide a power interface configured for being electrically associated with an external power source. For one embodiment, local power source 70 is a rechargeable battery. Local power source 70 may further be electrically associated with a charging device 72. Exemplary embodiments of charging devices include photovoltaic cells associated with housing 51 and electrically associated with battery 70.

As noted above for smart light controller 10, sensor 62 may be any number of sensors configured for generating a sensor signal related to the smart light 50 environment. Possible sensor technologies include temperature, visual (image), audio, continuity, power quality, proximity, and RF sensors. Discussion presented above for such sensors applies equally here.

Information unit 50 may further comprise a communication port 68 for electrically associating processing device 52 with external devices. One use for communication port 68 is to provide data path for translating data between processing device 52 and an external devices. Such data path may be used to transfer program code, firmware code, security codes, are in any other appropriate data. For example, communication port 68 may be used to activate information unit 50 using an external security device such as a dongle. For example, when a dongle device, comprising a security code, is electrically associated with port 68, processing device 52 retrieves a security code that is used to determine when a properly coded RF command signal/RF control signal (i.e. an RF signal comprising the same security code) has been received.

Figure 4:
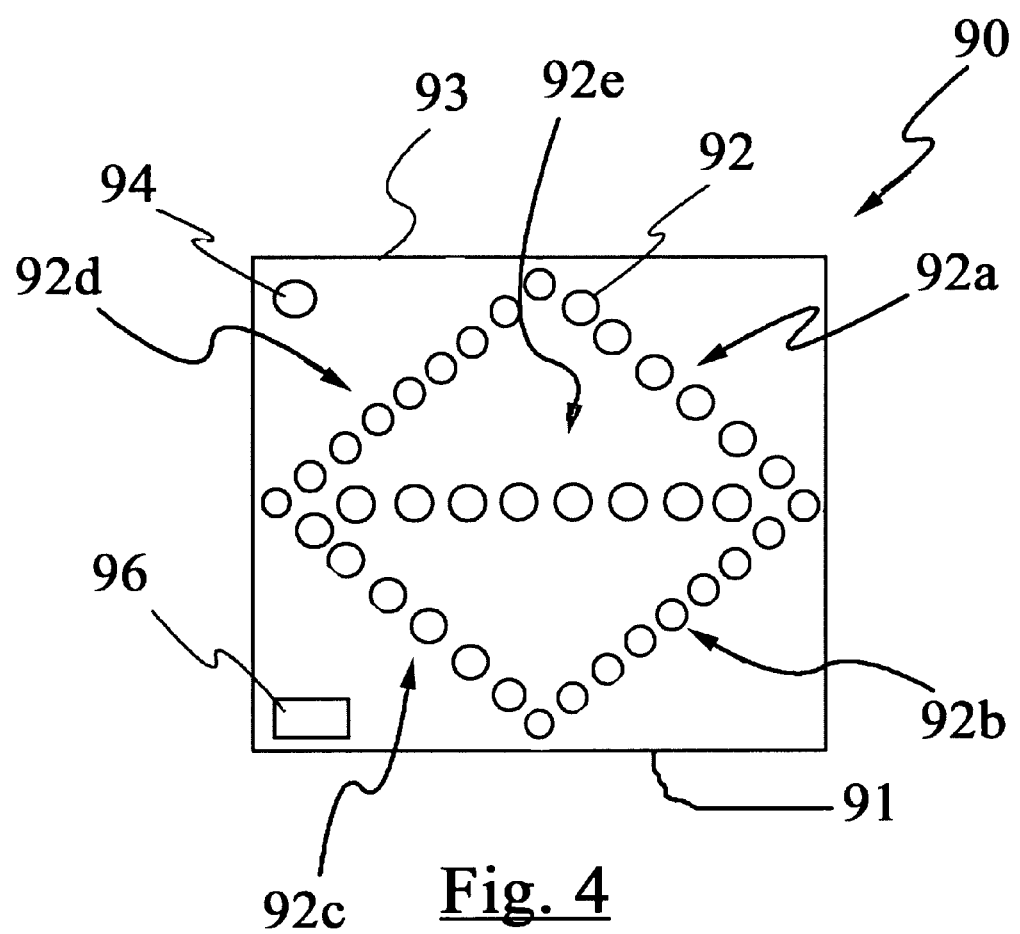
FIG. 4 is one exemplary embodiment of a universal display.

For one alternative embodiment of the invention, information indicator 64 comprises a universal display that may be used in a plurality of locations. Referring now to FIG. 4, one exemplary universal display 90 is presented. Universal display 90 comprises a plurality of LED lights 92 or other low power consumption light devices. For the embodiment depicted in FIG. 4, the LED lights 92 are configured in rows comprising row 92a, 92b, 92c, 92d, and 92e. Universal display 90 may further comprise sensor interface 94 and sound interface 96. Sensor interface 94 may be used, for example, to provide a window for an image sensor and sound interface 96 may provide an acoustic transparent boundary.

For the presently preferred embodiment, an orientation sensor is electrically associated with processing device 52. Processing device 52 uses orientation sensor to determine when housing 11 is oriented in a particular direction. For example, processing device 52 uses the orientation sensor to determine if side 93 or side 91 is the top side. If processing device 52 determines that side 93 is the top side, and processing device 52 receives a left turn signal, LED rows 92d, 92c, and 92e are activated. Alternatively, if processing device 52 determines that side 91 is the top side, and processing device 52 receives a left turn signal, LED rows 92a, 92b, and 92e are activated. One of ordinary skill in the art will appreciate that such a configuration allows information unit 64 comprising universal display 90 to be used as a left signal light or a right signal light without the need for a mode selector. For such an embodiment, the housing interface should be positioned in a universal location such as the center of the back of the unit or two housing interfaces should be used.

For another embodiment of the information unit 50, a motion sensor is electrically associated with processing device 52. For such embodiment, processing device 52 is configured to place information unit 50 and a sleep mode when no movement is detected for a predefined amount of time. While in sleep modes, processing device 52 continues checking for motion. When motion is detected, information unit 50 wakes up. Similarly, while in sleep mode, processing device 52 may periodically scanned for RF signals. As used in this document, periodically means to do something now and again at random intervals, to do something at predefined equal intervals, or randomly at unknown intervals.

For one alternative embodiment, the motion sensor is an accelerometer. Processing device 52 is configured to use the accelerometer to determine when information unit 50 is moving in a particular direction (such as reverse/packing up). When processing device 52 determines that information unit 50 is moving in a predefined direction, processing device 52 implements one or more predefined routines. For example, when information unit 50 is associated with a trailer, and processing device 52 determines that the trailer is backing up, processing device made generate a noise as a warning. In addition, processing device 52 may turn on backup lights.

Figure 5:
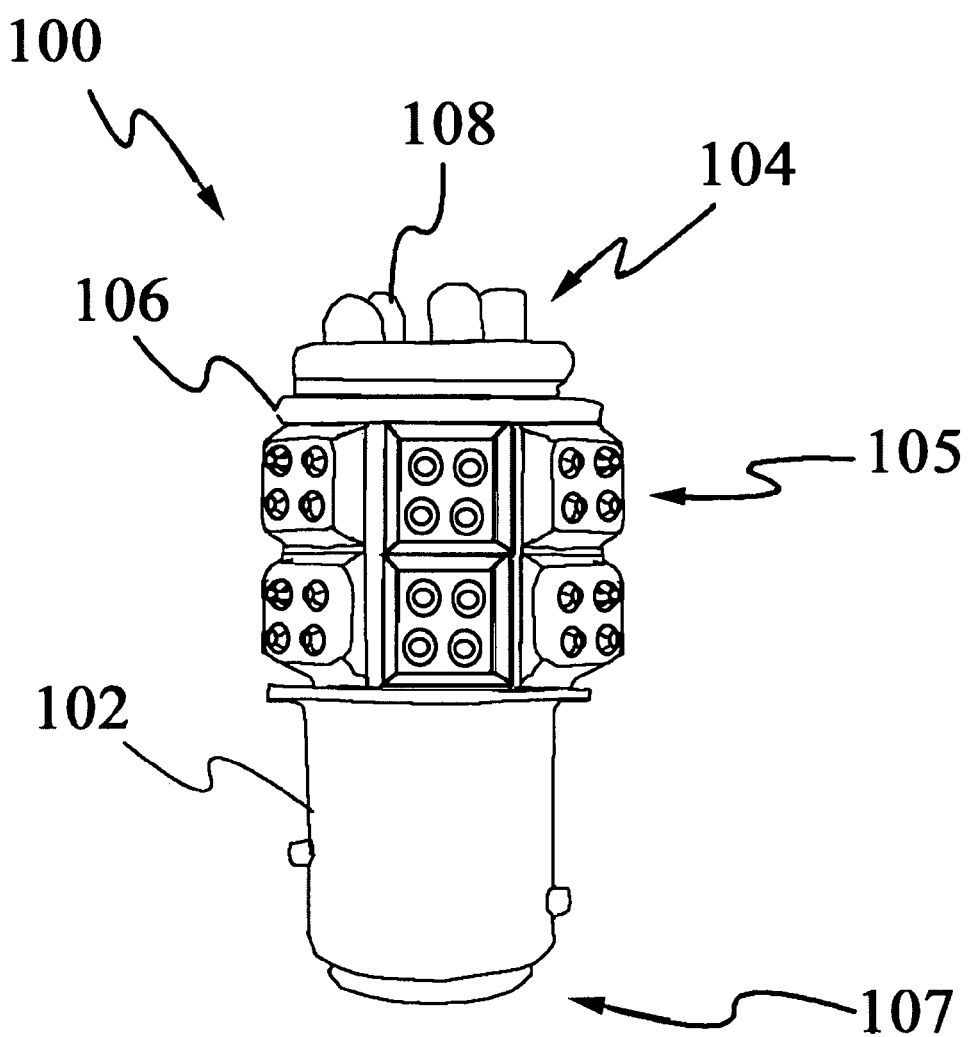
FIG. 5 is a side view of one exemplary embodiment of a smart vehicle light bulb.

Referring now to FIG. 5, one exemplary embodiment of a smart vehicle light bulb configured for transmitting RF-Command signals is presented. Smart vehicles light bulb 100 comprises a housing 102 defining a first end 107 and a second end 108, wherein said first end 107 is configured for being associated with the signal paths of a vehicle light interface. Embodiments of a vehicle light interface include light sockets found in a typical vehicle light fixture. It should be appreciated that for the configuration depicted in FIG. 5, smart vehicle light bulb 100 may be used to replace traditional incandescent vehicle light bulbs.

Second end 108 is configured for receiving a light-generator 108. As depicted in FIG. 5, light generator 108 comprises a plurality of relatively low power LEDs. It should be appreciated that any suitable light source may be used. In addition to light generator 108, secondary light sources one of five may be provided to generate more light.

A processing device is disposed in housing 100 and is electrically associated with a light generator 108 and said signal paths. Alternatively, the processing device may be disposed within light generator 108. The processing device preferably includes memory integral to the processing device although external memory may be used. Similarly, the processing device is an RF enabled chip such as the ones manufactured by Microchip or Chipcon. For such embodiment, the processing device is a single integrated component comprising a processor, memory, and a RF transmitter.

For the smart vehicle light bulb 100 configuration depicted in FIG. 5, when power is supplied to second end 107, at least one light source is activated. A light source 108 may provide a stop signal function while secondary light source 105 provides a running light function. In addition, the processing device is configured to detect such power signals and transmit a control signal to a remote device such as a trailer light. Thus, the signal light function is "cloned" to a second remote smart light unit.

In addition, the processing device within smart vehicle light bulb 100 may be further configured to monitor the power quality of the power being supplied to the smart vehicle light bulb and to turn off said smart vehicle light bulb when the determined power quality falls below a predefined level. The processing device may additionally transmit a power quality warning signal.

Smart vehicle light bulb 100 may further include a high powered focused light source electrically associated with said processing device. The focused light source is configured for generating a warning signal to other vehicles. Preferably, the focused light source is of sufficient power to generate a warning signal that can be intercepted by a second vehicle following a first vehicle. The first vehicle has taillights comprising smart vehicle light bulbs including the focused light source feature. When a driver in the first vehicle applies the brakes, the smart vehicle light bulbs activate indicating the vehicle is stopping and the focused light source activates and transmits a stop warning signal to a vehicle that may be following and within range of the stop warning signal. If a second car following the first car is appropriately equipped with a receiving device, the stop warning signal will be intercepted and a notification will be issued to the driver of the second vehicle. Alternatively, as noted above, the smart light bulb 100 may comprise sensors such as an accelerometer and proximity sensors. Smart bulb 100 may transmit said stop warning signal based at least in part of such sensor signals and a receiver in the second vehicle may be configured to automatically apply the brakes thereby slowing down the second vehicle (e.g. when the accelerometer reading indicates the first vehicle's brakes have been "slammed on" and/or the second car is "too close").

Figure 6:
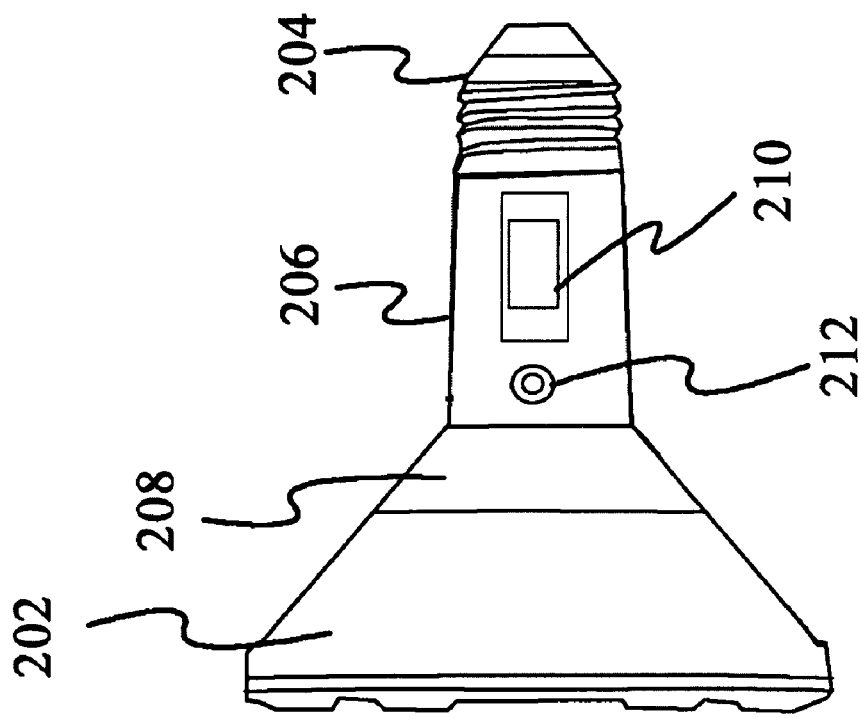
FIG. 6 is a side view of one exemplary smart light configured for being electrically associated with a light fixture.

Referring now to FIG. 6, one exemplary embodiment of a smart light configured to provide a plurality of lighting functions is presented. For the smart light 200 depicted in FIG. 6, the smart light comprises a housing 206 defining a first end 204 and a second end 202. Dispose between first end 204 and second end 202 is backup power source 208. Dispose within housing 206, his electronic module configured for controlling smart light 200. The electronic module comprises a processing device electrically associated with a memory. The processing device is further electrically with a transceiver that is electrically associated with an antenna. Such electoral associations are similar to the one described above.

As depicted in FIG. 6, the first end 204 of smart light 200 is configured for being associated with a power fixture. For the presently preferred embodiment, first end 204 defines a traditional light socket screw in electrical connection. Such a feature allows smart light 200 to be electrically associated with a typical lighting fixture found in many homes. When first end 204 is electrically associated with a power fixture, and the power fixture is active, power to smart light 200 is supplied by the power fixture.

The processing device is further electrically associated with a backup power source dispose within housing 206. When the power fixture described above is not supplying power, the backup power source may be activated to supply power to smart light 200. The processing device is further electrically associated with a power conditioning circuit configured for converting the power supplied by the power fixture to power that is compatible with light source 200. Such converted power is also used to maintain the rechargeable backup power source power level.

Processing device 200 is further electrically associated with switch 210. Switch 210 is configured for turning off or turning on smart light 200. Such a feature can be accomplished by either interrupting the power path between the power source and the light source or constructing the processing device to interrupt such power path.

Processing device 200 is further configured for communicating with a home alarm system. Processing device 200 is configured to receive control signals from the alarm system and implement functions corresponding to the control signals. Such functions may be to turn home or turn off smart light 200 a predefined time. In addition, a sensor may be electrically associated with the processing device. Such sensor and may include a smoke sensor, a CO2 sensor, a motion sensor, and a power failed. The processing device is configured to monitor the output of such sensors and generate a sensor status signal at a predefined time or when a sensor generates a sensor signal that substantially complies with a predefined state. For example, the sensor is a smoke sensor and the spoke sensor is generating a smoke detected signal, the processing device will transmit the appropriate signal to the alarm system.

It will be further appreciated by one of ordinary skill in the art that smart light 200 may be removed from a light fixture and used as a typical flashlight. In addition, the backup battery provides emergency lighting for as long as the backup battery has sufficient power.

In addition to switch 210, smart light 200 comprises alert signal button 212. Alert signal button to 12 may be used to instruct smart light 200 to generate an alarm signal. Such a feature may be useful when an emergency condition is detected while using smart like 200 as a flashlight.

Figure 7:
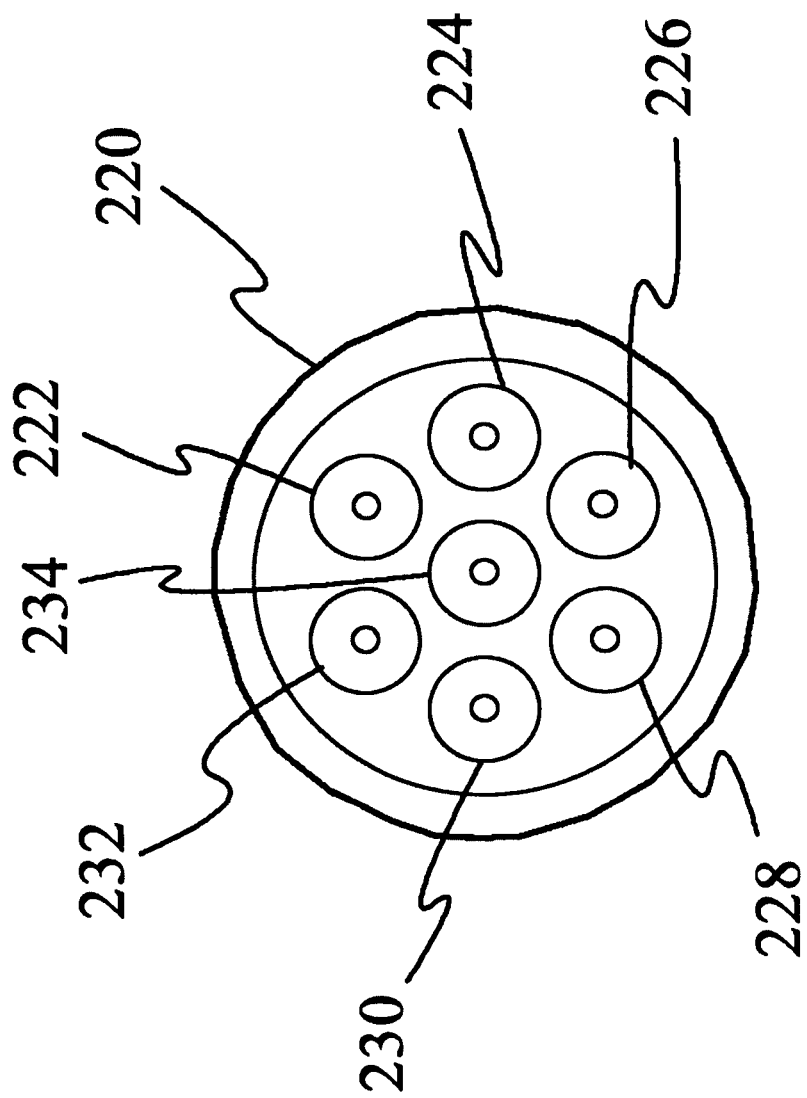
FIG. 7 is a front view of the light generators for the smart light depicted in FIG. 6. Repeat use of reference characters throughout the present specification and appended drawings is intended to represent the same or analogous features or elements of the present technology.

Referring now to FIG. 7, a plurality of light generators is depicted. For the presently preferred embodiment, such like generators are LEDs. As depicted in FIG. 7, there are seven LED light generators (222 through 234). For the preferred embodiment, every other LED is a relatively low power consumption LED while remaining LEDs are relatively high power consumption LED. For such embodiment, the processing device is configured to use the low power consumption LEDs when the backup battery is powering smart light 200. All the LEDs are used when a light fixture is powering smart light 200.

Electronic Devices

Exemplary electronic devices for performing the above described functions are now presented. The electronic modules and control apparatus associated with local and remote devices may comprise all of or a portion of the features described below. Initially, it should be appreciated that the functions represented in block diagrams by individual blocks may be performed by ASSPs (Application Specific Standard Product) although one or more blocks may be integrated into ASSP chip sets. Manufactures of such devices include Motorola, and Texas Instruments. In addition, Complex Programmable Logic Devices (CPLD) may be used to interface the various ASSP blocks to system buss (101) allowing one system component to interface with another component. Manufactures of suitable CPLD devices include Lattice's (ispMACH 4000 family) and (Altera's MAX 7000-series CPLD).

The processing devices described above are preferably low power consumption PICs or microprocessor such as ASICs (application specific integrated circuit) or ASSPs (application specific standard product).

DSP/ASSP may be electrically associated with the processing device. Such DSP devices are preferably configured to perform signal processing tasks such as voice, audio, video, encoding, decoding as well as other data and signal processing functions.

The above described devices may further comprise communication circuitry comprising a transceiver electrically associated with antenna. Such communications circuitry is configured to transmit a data signal to a remote electronic device. It should be noted that embodiments where such communication circuitry comprises only a transmitter fall within the scope of the invention. For the preferred embodiment, transceiver comprises a relatively low power transmitter that transmits a data signal in an unlicensed frequency although such transceiver may comprise any number of well known technologies for wireless communications that transmit at any legal power level. For example, communication circuitry may be configured to communicate over GPRS, GSM, GPRS, 3G, and EDGE enabled networks as well as WAP networks.

Low Power transceiver comprises a low power transmitter relative to the above described high power transceiver and operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through a FM radio.

Some embodiments may comprise a GPS device electrically associated with the processing device. Such a GPS is one embodiment of a location-detector electrically associated with a processing device and configured to generate location-data for the location of smart light controller.

An Imaging element of may be electrically associated with the processing device. Such an imaging element may be configured for acquiring images to be transmitted to remote devices. For the preferred embodiment, the imaging element is configured to support CMOS image input sensors such as the one manufactured by Micron® and/or CCD (charge-coupled device) image input sensors such as the ones manufactured by ATMEL® sensors. The imaging element comprises an imaging interface that performs the necessary processing functions to convert the imaging data into a desired format before transferring such data to other devices.

For one embodiment, a sound sensor is electrically associated with the processing device. Such sound sensor may comprise a speaker and a microphone electrically associated with audio codex. Such sound sensor is configured for detecting sound waves and converting such waves into digital data of a predefined format such as MP3. In addition, the sound sensor may further comprise a sound transducer such as a speaker to issue warnings and provide for other forms of communications. It should be appreciated by those of ordinary skill in the art that a microphone may be used to provide a bio-sample to the processing device.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart light controller configured for transmitting light command signals, said smart light controller comprising:
a housing defining a first end and a second end, wherein said first end is configured for being associated with a light-command generator comprising light-command signal paths;
a control-unit disposed within said housing, said control-unit comprising a processing device associated with a memory and a transmitter electrically associated with an antenna, wherein said processing device is electrically associated with said light-command signal-paths;
wherein said housing defines a first connector suitable for being associated with a second connector comprising said light-command signal paths associated with said light-command generator; and
wherein said control-unit is configured to receive signals from said light-command generator and transmit a corresponding RF-Command signal.

2. A smart light controller configured for transmitting light command signals as in claim 1, wherein said light-command generator is a vehicle and wherein said first connector defines a male plug and wherein said second connector defines a female socket comprising said light-command signal paths associated with the electrical system of a vehicle.

3. A smart light controller configured for transmitting light command signals as in claim 2, wherein said second end defines a pass-through-connector electrically associated with said light-command signal-paths thereby providing wired access to such light-command generator signal paths.

4. A smart light controller configured for transmitting light command signals as in claim 2, wherein said second end further defines a communication-port electrically associated with said processing device.

5. A smart light controller configured for transmitting light command signals as in claim 2, further comprising at least one sensor selected from the group of sensors consisting of: (a) video; (b) audio; (c) temperature; (d) power quality; (e) proximity; (f) RF and (g) acceleration.

6. A smart light controller configured for transmitting light command signals as in claim 5, further comprising at bio-sensor.

7. A smart light controller configured for transmitting light command signals as in claim 2, further comprising a security-interface associated with said housing.

8. A controller configured for being electrically associated with a vehicle wiring system, said controller comprising:
a housing defining a first end and a second end and wherein said first end defines an input-interface configured for being electrically associated with a vehicle wiring system configured for transferring at least one of (a) vehicle power and (b) vehicle control signals;
a processing device disposed within said housing, said processing device configured for being electrically associated with said input-interface;
a transmitter electrically associated with said processing device and further electrically associated with an antenna;
wherein said processing device and said transmitter receive power from at least one of (a) said vehicle-power and (b) a power source disposed within said housing;
wherein said housing defines a first connector suitable for being releasably associated with a second connector comprising said light-command signal paths associated with said light-command generator; and
wherein said processing device is further configured to detect said vehicle control signals and generate corresponding RF-Control signals and transmit said RF-Control signals using said transmitter.

9. A controller as in claim 8, wherein said first connector defines a male plug and said second connector defines a female plug and wherein said male plug is suitable for being releasably associated with said female socket configured to provide access to the light-command signal paths electrically associated with said vehicle wiring system.

10. A controller as in claim 9, wherein said second end defines a pass-through-connector electrically associated with said input-interface thereby providing access to said vehicle wiring system.

11. A controller as in claim 10, wherein said housing further defines a communication-port electrically associated with said processing device.

12. A controller as in claim 8, wherein said housing is configured for being mechanically associated with said vehicle and wherein said input-interface is electrically associated with a housing-connector through a plurality of wires and wherein said housing-connector is configured for being associated with a vehicle connector configured for providing access to said vehicle wiring system thereby electrically associating said input-interface to said vehicle wiring system.

13. A controller as in claim 12, wherein said processing device is further configured to generate and transmit an vehicle-command-signal configured for being received by an electronic device associated with said vehicle.

14. A controller as in claim 13, wherein said vehicle-command-signal instructs said electronic device to do one of (a) blow the vehicles horn, (b) flash a light and (c) stop the vehicle.

15. A RF-enabled control system configured for transmitting control-signals from a tow vehicle to a device associated with a vehicle being towed, said RF-enabled control system comprising;

a Control-Unit comprising a CU-housing comprising a first connector defining a CU-input interface, said first connector configured for being removably mechanically associated with a second connector mechanically associated with a tow vehicle, said second connector comprising light-command signal pates electrically associated with the wiring system of said tow vehicle and configured for providing access to light command signals generated by said tow vehicle, so that said CU-input interface is electrically associated with the wiring system of said tow vehicle when said first connector is associated with said second connector, said CU-input interface further electrically associated with a CU-processing device disposed within said CU-housing, said CU-processing device further electrically associated with a CU-transmitter associated with an antenna;

wherein said CU-input interface is configured for transferring, to said CU-processing device, at least one of (a) power and (b) said light command signals and wherein said CU-processing device is configured to detect said light command signals and generate corresponding RF-signals and transmit said RF-signals using said CU-transmitter; and an Information Unit comprising a IU-housing configured for being removably mechanically associated with a vehicle being towed, said information unit further comprising an IU-processing device disposed within said IU-housing and electrically associated with an IU-receiver, an IU display and a power source, wherein said IU-processing device is configured to receive said RF-signals and generate corresponding IU-control-signals and transfer said IU-control-signals to said IU display.

16. A RF-enabled control system as in claim 15, wherein said IU-display defines a universal display configured to operate in one of a plurality of display modes, said universal display comprising a plurality of selectively enabled light sources and wherein said Information Unit further comprises an orientation sensor electrically associated with said IU-processing device and wherein said IU-processing device is further configured to use said orientation sensor to automatically select one display mode from a plurality of display modes.

17. A RF-enabled control system as in claim 16, wherein said IU-Control Unit further comprises an acceleration sensor electrically associated with said IU-processing device and wherein said IU-processing device is configured to monitor the output of said acceleration sensor and transmit a warning signal when a predefined acceleration level is indicated.

* * * * *